(12) United States Patent
Fry et al.

(10) Patent No.: US 8,731,308 B2
(45) Date of Patent: May 20, 2014

(54) INTERACTIVE IMAGE SELECTION METHOD

(75) Inventors: Peter Thomas Fry, Wicken (GB); John Denis Piper, Cambridge (GB); Graham Robert Kiddle, Ely (GB); Hani Muammar, Cambridge (GB); Alan Payne, Chesterton (GB)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 313 days.

(21) Appl. No.: 13/122,153

(22) PCT Filed: Aug. 12, 2009

(86) PCT No.: PCT/EP2009/060451
§ 371 (c)(1),
(2), (4) Date: Apr. 1, 2011

(87) PCT Pub. No.: WO2010/037591
PCT Pub. Date: Apr. 8, 2010

(65) Prior Publication Data
US 2012/0114257 A1 May 10, 2012

(30) Foreign Application Priority Data
Oct. 3, 2008 (GB) .................................. 0818089.5

(51) Int. Cl.
*G06K 7/00* (2006.01)
*H04N 5/66* (2006.01)

(52) U.S. Cl.
USPC ............................ 382/224; 382/312; 348/739

(58) Field of Classification Search
CPC ........... G06K 9/00664; G06K 9/00711; G06F 17/30265; G06F 17/30247; G06F 17/3028; G06F 17/30256; H04N 1/40062

USPC ......... 382/224, 312, 100, 137, 138, 276, 284; 428/914, 913; 358/471, 400, 500, 518; 348/739, 744, 759, 760, 761, 218.1, 348/207.99; 339/130, 297, 310, 314, 166, 339/159

See application file for complete search history.

(56) References Cited

U.S. PATENT DOCUMENTS 6,922,699 B2  7/2005  Schuetze et al.
7,043,474 B2  5/2006  Mojsilovic et al.
(Continued)

FOREIGN PATENT DOCUMENTS

GB  2 367 158  3/2002
JP  2006-172097  6/2006
(Continued)

OTHER PUBLICATIONS

Communication from the European Patent Office for European Application 09781764.7, dated Feb. 21, 2013.

(Continued)

*Primary Examiner* — Sheela Chawan (57) ABSTRACT

Image selection method amongst a plurality of digital images (102) classified in a plurality of images categories (104*a*, 104*b* 104*c*), the method comprising the following steps: —allocating to each image at least one strength value (112, 112*i*, 112*j*, 112*k*), —allowing an user to select (120) images amongst the plurality of digital images, —collecting (122) user data, —updating (130) the strength value of all images classified in a same category than an image selected by the user as a function of the collected user data, and —upon selection of an image by the user, automatically selecting (142) at least one additional image classified in at least one same category than an image selected by the user, and for which the strength value exceeds a threshold value —making the selected images available (146) for subsequent use.

20 Claims, 3 Drawing Sheets

(56) References Cited

U.S. PATENT DOCUMENTS

| | | | |
|---|---|---|---|
| 7,663,643 B2* | 2/2010 | Shiota et al. | 345/619 |
| 8,090,712 B2 | 1/2012 | Shellshear | |
| 8,335,355 B2* | 12/2012 | Costache et al. | 382/118 |
| 2003/0074368 A1 | 4/2003 | Schuetze et al. | |
| 2003/0195883 A1 | 10/2003 | Mojsilovic et al. | |
| 2006/0050933 A1 | 3/2006 | Adam et al. | |
| 2006/0055977 A1 | 3/2006 | Shiota et al. | |
| 2006/0164511 A1* | 7/2006 | Krupnik | 348/65 |
| 2007/0143714 A1* | 6/2007 | Barbieri | 715/861 |

FOREIGN PATENT DOCUMENTS

| | | |
|---|---|---|
| JP | 2006-229682 | 8/2006 |
| JP | 2007-188404 | 7/2007 |
| JP | 2007-527065 | 9/2007 |
| JP | 2007-279174 | 10/2007 |
| WO | WO-2005/088477 | 9/2005 |
| WO | 2007/046534 | 4/2007 |

OTHER PUBLICATIONS

International Preliminary Report on Patentability for PCT/EP2009/060451, issued Apr. 5, 2011.

Official Action on Japanese Application 2011-529492, mailed Sep. 3, 2013 (English translation not available).

Non-Final Office Action on U.S. Appl. No. 13/251,500, mailed Feb. 12, 2014.

* cited by examiner

INTERACTIVE IMAGE SELECTION METHOD

FIELD OF THE INVENTION

The present invention relates to an intuitu personae and interactive browsing and selection method for an image collection. The so-called intuitu personae method aims to adapt the image browsing and image selection to the user's wishes and possibly to a relationship between the user and iconic content of the images.

The method is adapted to browse through a collection of digital images and applies especially to home photos. However, the method can also be carried out in the fields of photo edition, video edition, and computer aided design of photographic products such as photo albums. The browsing method may be carried out on a computer, but also on any multimedia device having a display screen and built-in or remote computing capability.

BACKGROUND OF THE INVENTION

With an increasing use of digital cameras, along with the digitization of existing photograph collections, it is not uncommon for a personal image collection to contain many thousands of images.

The high number of images usually renders their classification in smaller sub-sets necessary to avoid a fastidious browsing. A classification can typically be based on textual annotation of the images, on labels or tags in the form of metadata added to images, or any other form of static classification requiring user explicit input. Such classifications however suffer from drawbacks. One drawback is that a classification corresponding to the taste of a given user of the collection of images, at the current moment in time, does not necessarily correspond to the taste of other possible users or the same user at another time, or different context of use. Another drawback is that many images/photographs may remain unlabelled or unclassified, since a classification requiring user input usually appears as a fastidious task.

To save the user from the classification efforts, some retrieval systems rely on objective image content analysis rather than existing image labels or tags. Data on image content likely to be used for classification or image retrieval may result from so called low level analysis or high level analysis of the image. A low level analysis comprises, for example, colours analysis, spatial frequency analysis, texture analysis, or histograms analysis, etc. High level analysis rather involves algorithms to derive information from the semantic content of the images. As an example of high level analysis, processing engines may be used to identify in an image semantic content such as human faces, skin, animals, sky, water, sea, grass etc.

The semantic content as well as some other low level features mentioned above may in turn be used separately or in combination to calculate a similarity between images and finally to classify the images based on their similarity.

As an illustration of existing classification and image searching methods, documents (1) to (3), whose references are indicated at the end of the description, may be referred to.

SUMMARY OF THE INVENTION

As noted above, existing classification and retrieval methods based on image annotation, or image labeling, heavily rely on human input.

Such methods tend to be not appropriate to large collections of images or to collection of images for which poor human interpretation is available.

Classification and/or retrieval methods based on objective image analysis, whatever high or low level analysis, may be better adapted to large collections of images or to collections of images that have not be previously annotated or labeled. However, a classification or a retrieval process based on preset algorithms or calculation methods do not necessarily match the taste of every possible user, the changing context of image use or the needs of a specific user.

The invention also results from the observation that collecting possible user input whilst the user is viewing photos, appears less fastidious to the user than input that would be collected in a methodical and interactive image classification method.

The invention suggests a method that aims to overcome the above mentioned drawbacks and that offers to the user a more natural image searching, more closely related to the old "shoe box" paradigm.

The invention additionally suggests a possible image display that in turn increases the feeling of a natural and intuitive image searching.

To achieve such objectives, the invention more precisely suggests a method for selecting images to be displayed, amongst a plurality of digital images classified in a plurality of images categories. The method comprises the following steps:

allocating to each image a strength value, allowing a user to select images amongst the plurality of digital images, collecting user data, updating the strength value of images classified in the same category as an image selected by the user as a function of the collected user data, and upon selection of an image by the user, automatically selecting at least one additional image classified in at least one same category to the image selected by the user, the additional image being selected based on its strength value, making the selected images available for a subsequent use, such as display, printing, processing or exchange.

Especially additional images for which the strength value exceeds a threshold value may be selected.

For the sake of simplification, and as far as the context appears explicit, the terms "digital image" is indistinctly used to refer to the iconic content of an image likely to be displayed or printed and to refer to the corresponding digital data or metadata stored in a memory. It is however understood that the term refers to the data as far as an image processing is concerned and that the term refers to a visible display or print as far as interactions with a user are concerned. The plurality of images, or image collection, may be all or part of the images stored in a remote, a built in, or a removable memory to which an image processing device has access. The collection may be closed or open to updates.

The invention allows to automatically select and possibly display for a user one or more images in addition to a first image that the user has selected himself. The aim is to select additional images that match as closely as possible to the selection context and a deemed user's interest. The combined use of the image categories and the strength values of the images, allows to bring together, and especially to display together, related or partially related images. As an example: images of a same person in different locations.

The selection of the above mentioned additional images can be completed with some additional images of the appropriate category but for which the strength value fails to exceed the threshold value. As an example, it is possible to select some additional images with low, or even the lowest strength value. Also, the process may comprise a selection of one or more random or unexpected image in the current browsing context, i.e. images which are not in the selected categories. Such minority additional images then offer the user an alternative browsing direction.

The strength value is used as a metric that gives in a way a measure of the user interest for a given image in the image collection. The user interest is not measured directly but is derived from the collected user data according to a set of inference rules. As explained below, the collected user data may include implicit and/or explicit user data.

One or a plurality of strength values can be allocated to each image of the image collection. When a plurality of strengths values are used for each image of the collection, then an option is to respectively set for each image a strength value specific to a user amongst a plurality of possible users of the collection. Since the strength values aims to reflect the interest of a user for an image, a plurality of strength values allow to reflect the interest and to match the taste of different users.

As mentioned above, the method is carried out on a collection of images classified in image categories. The image categories can be preset or may change during the process. As an example, additional image categories can be added if a predetermined number of images having similar image features, distinctive of the features of images in other existing categories, is determined by high or low-level image analysis. Additional image categories may also result from explicit user input creating new categories.

It shall also be noted that a same image can belong to different categories. As an example, an image containing semantic features recognized as the face of a person P, and taken at a given time or at a given event, such as a birthday, may belong to several categories. The image may belong to a first category that could be "person P", to a second category which could be "birthday" and still to a third category which could be based on the month or the date of capture.

Basically, an image can be classified in one or several categories or classes such as:
  a category corresponding to semantic content of the image,
  a category corresponding to the significance of the image to the current viewer as a result of the viewers context: such a category may be related to a geographic location where an image is captured or where the user is located, or supposed to be located, when the image selection method is carried out. Geographic data may be derived from explicit user input or from a positioning device integrated in the image capture device, or in the image-browsing device. If one or several categories correspond to the user's geographic location, determined for example with a GPS system (Global Positioning System) then such categories may be merely temporary categories subjected to a dynamic category change. Another possible category may be:
  a category corresponding to the significance of the image to the current viewer as a result of their life experience: such a category may be related, for example, to a birthday, a marriage, a party etc. More generally, such a category may be used when specific knowledge about a user is available, for example the fact that a person identified on an image is the user's newborn child.
Still other possible categories are:
  a category corresponding to a time- or date-frame in which the image has been captured,
  a category corresponding to a key word stored as a metadata along with the image data,
  a category of images selected by a user in the same session on a selection/viewing device.

If the collection of images is not already classified, the invention can additionally include following preliminary steps:
  collecting images,
  determining features of the collected images based on image data and/or image metadata computation,
  searching for similarities between computed features for sets of images, and/or searching similarities between computed features and preset features of image categories,
  sorting images having similar features in common categories.

The step of collecting images may comprise reading the image data in a memory, downloading the data from a server, or even capturing the images with a camera or a scanner.

The method may also comprise the automatic creation of a new category of images each time a similarity is found amongst a preset number of images.

The similarity is here understood as a given degree of similarity. For example, images are put into a new image category if the similarity of at least one feature of such images is stronger than the similarity with features of existing categories.

The metric used to compare the degree of similarity can be determined with respect to the similarity calculation algorithms. As an example, if the similarity calculation is a cross correlation of image data, then the value of the cross correlation can directly be used as a measure of the degree of similarity.

Similarity searching can also use logical comparisons based on geographic locations of image capture, image capture time ranges or computed features of semantic contents.

In a much less sophisticated embodiment of the invention it would also be possible to randomly classify images in classes.

One key aspect of the invention is the update of the strength values of the images, i.e. the update of a data that measures an interest that a user is deemed to have for a given image of the collection.

The update is based on collected user data and on one or several predetermined updating rules. User data is understood as data related to some information about a user or data reflecting behavior of a user.

As an example, the collection of user data may comprise one or several amongst the following actions:
  measuring a display duration for each image viewed by the user,
  measuring a similarity between images browsed by the user,
  explicit user feedback in response to a question,
  collecting data on the user's name, date of birth, age, location,
  counting the number of clicks performed on a computer keyboard/mouse, whilst an image selected by the user is displayed,
  capturing an additional image of the user's face,
  measuring emotive response of the user to viewed images by analysing user physiology; facial changes, pupil size, skin conductivity, and treating as a measure of viewer reaction to the image(s) selected,
  collecting data on prior images viewed by the same user.

All these data can be obtained by monitoring the user's interaction with a device used to perform the method of the invention.

The former example of the capture of an image, and especially a photograph of the user's face, may be used with a face recognition algorithm to recognize the user's face and to determine in which images of the collection the user's face is also present. This relies then on the assumption that the user is likely to have some interest for images representing his face.

Face recognition algorithms are as such well known and are therefore not described with further details here.

Based on the user data, the strength value can then be updated for images belonging to the same category, or categories, than the selected image.

The strength value can be updated by one or more predetermined updating rules amongst:
  an update value proportional to the display duration of the selected image,
  an update value proportional to a correlation or a degree of similarity of the semantic content of the selected image and the image of the user's face,
  an update value proportional to the amplitude or function of the type of user's emotive response, as measured by any number of well known methods such as physiologic change,
  a preset update value when the user's name, date of birth or location is found in the metadata of the selected image,
  an update value proportional to the number of clicks performed whilst the selected image is displayed.

The updating rule may be chosen as a function of the type of user data that have been collected.

Although the update of the strength value is preferably based only on an assumed interest derived from user data, it would be possible, in addition, also to update the strength value based on semantic content derived directly from the image.

The update of the strength value may also be based on data not contained in the image, i.e. the value of an image maybe high because it's the first image of a new baby.

As noted above, an automatic selection of additional images is made. This selection takes into account the categories to which the image selected by the user belongs to, and the strength value of the images in such categories.

One or more additional images for which the strength value exceeds a threshold may be selected. This threshold can be predetermined and can be the same for all images. The threshold may also be different for images in different categories. It may be a function of the number of the images in a given category and/or a function of a mean strength value of images in a given category.

Variable threshold can be used to control the number of additional images that are retained. This allows matching the number of images, for example, with the display capability of a display means used to view the selected images. The threshold may therefore also be set as a function of the display capability of a display means.

According to another option, the threshold for the number of additional images may also be a function of a deemed user interest derived from the collected user data.

The selected images, i.e. the image selected by the user, and the additional images that are automatically selected by the browsing method are finally made available for further use. This last step may include the display of the selected images, the printing of selected images and/or the sending of corresponding images data to a remote device such as a multimedia device, a TV, a digital photo frame, a server, a phone cam, etc.

Making the images available may also include allowing the user to use the data of selected images as a start point for further browsing or for image processing.

The method of the invention is likely to result in the display of a number of images greater than the number of images selected by the user as far as the additional images are displayed simultaneously with the image selected by the user.

There may therefore be an additional need to display the images in such a way that the additional images do not disturb or mislead the user in his browsing plans but rather can be used as a guidance for further browsing.

Therefore, according to an improvement, the selected images corresponding to different categories are preferably displayed in different areas of a display screen and/or each selected images is displayed with a relative size which is a function of the strength value of said image.

An example of a possible display layout using such features is described further below.

The invention is also related to a computer program or software on a carrier such as an integrated circuit or data storage means, able to carry out the method according to the invention.

The program may be any code, including source code, in a form suitable to perform the method as described.

The invention is further related to a storage medium comprising instructions adapted for performing the method as described.

Other characteristics and advantages of the invention will appear in the following description with reference to the figures in the appended drawings. This description is given as a non-limiting illustration.

DESCRIPTION OF THE EMBODIMENTS

In the following description identical or similar parts of different figures are indicated with the same reference signs.

Figure 1:
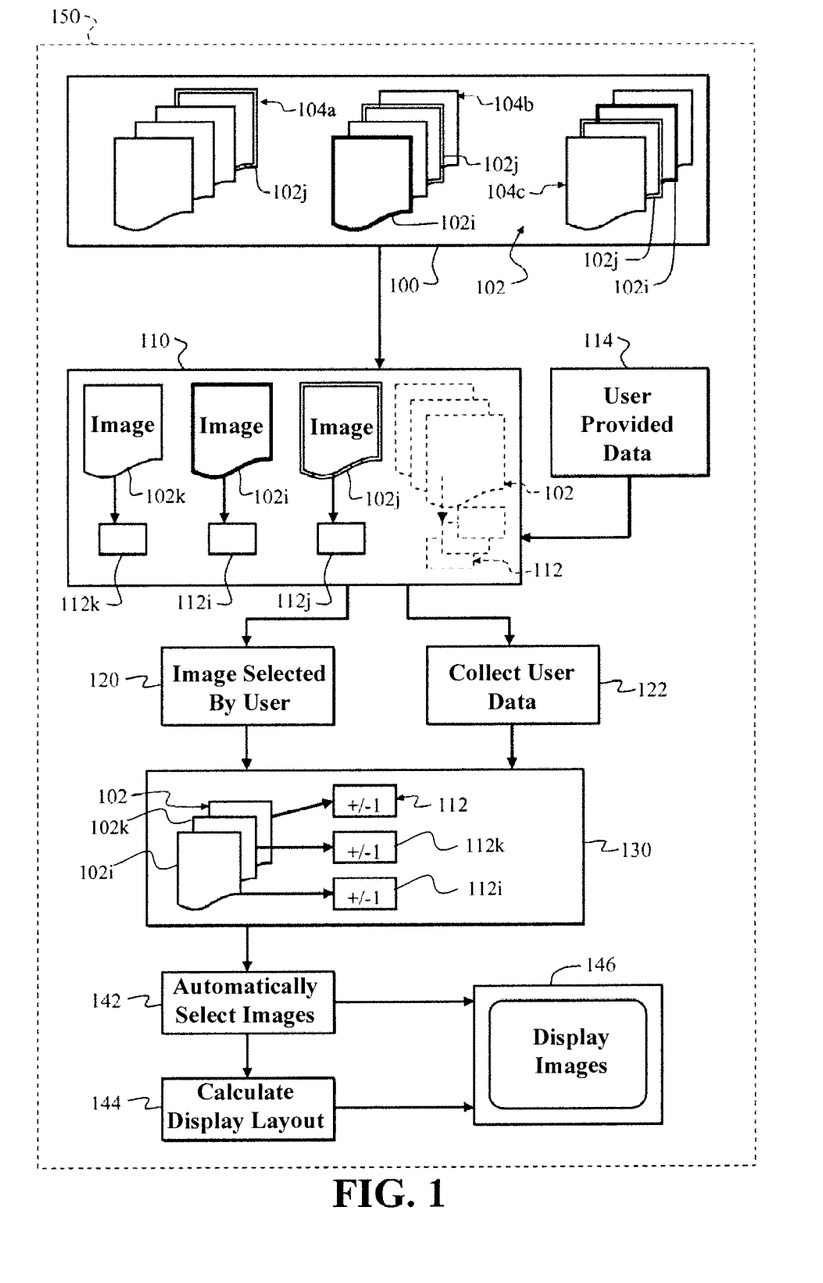
FIG. 1 is a flow chart illustrating an image selection method corresponding to the invention.

Reference 100 of FIG. 1 relates to a first step of an image selection process corresponding to the provision of a collection of classified images 102. As explained later, this first step may include a preliminary sorting of the images in different classes. The collection of digital images 102 comprises a plurality of classes 104a, 104b, 104c of images each comprising a plurality of images 102, 102i, 102j. The images in a same class have similar image features. As an example, a class may contain all the images that have been captured for a given event, such as a birthday party, or all images that have been captured at a same day or in a same time range. A class may also contain all the images on which the face of a given person has been recognized by a face recognition algorithm.

A same image can belong to several different image classes if the image has features corresponding to such classes. As an example, an image, of a given person, taken at his/her birthday party at a given date may belong to each of the above-mentioned classes. In the example of FIG. 1, an image 102i represented in bold belongs both to class 104b and 104c. An image 102j represented in doubled line belongs to classes 104a, 104b and 104c.

In a step 110, the method then allocates to each image 102, 102*i*, 102*j*, 102*k* one or a plurality of strength values 112, 112*i*, 112*j*, 112*k*. When the method is initially run, all the strength values can be set to a same initial value. The values can also be initially set as a function of a semantic content of the images or another image feature. As an example, more recent images, or images in which a face recognition algorithm recognizes a human face, may get a higher initial strength value than older images or images without human face.

The fact of belonging to a class, as well as the strength value of the images may be stored in the form of separate data or data files or may be part of image metadata.

The initial strength value allocated to the image is not critical since the strength values are updated whilst the process is run.

Each time the process is resumed, step 110 may comprise the allocation to each image of its strength value as it was when a given user previously ran the process. The strength values can be stored in a memory.

In an additional step 114 a user may be invited to enter his name or any kind of identification. The user identification can be used in step 110 to retrieve, for each image, the respective strength value as it was stored for the specific identified user.

The process allows the user to browse through the image collection using any per se known browsing method and allows the user to select images. The selection of an image by the user is indicated with reference sign 120. This selection can be made by depressing a selection button, in touching a screen, in clicking on a computer mouse etc.

Whilst browsing through the image collection, and more generally whilst the user is interacting with the device used to carry out the method of the invention, user data are collected. This corresponds to step 122 on FIG. 1. User data can also be collected at another time and stored in a memory until being used by the method.

As previously mentioned, the user data may include data about the user such as his/her date of birth, his/her address, a photograph of the user's face or any other references that the user may be invited to enter as an input. Other user data may include data about the user's behavior or physiologic reaction whilst he/she is browsing through the collection, or viewing images of the collection. The latter may include data on how long an image was viewed, on how many clicks or data input have been made whilst the image was viewed, on whether an image has been processed or altered etc.

The user data available for an image are converted in a deemed user interest according to a set of predetermined rules and the strength values of the images are updated accordingly in a subsequent step 130.

As previously mentioned, according to one possible rule, the strength value data of an image may be updated by a value proportional to relative display duration of that image. This is based on an implicit rule that a user tends to view for a longer time images that are interesting to him. The strength value of such images is then increased.

To the contrary, an image that would have been discarded from a subset of images that the user has processed may be considered as not interesting to the user. Its strength value may be lowered.

More sophisticated rules can be based on calculations made on the image content. This can be a cross correlation calculation or face recognition. As an example, an image in which the user's face is recognized by a face recognition algorithm, may be considered as interesting for the user and its strength value may be increased.

The amount a strength value of an image is increased, or possibly decreased, may be preset, proportional to a scalable user data, or weighted with respect to other images of the collection or other images of a same category.

In addition, the strength value of an image may be also updated based on calculations or data that are not linked to a user but based on low or high level analysis of the images. As an example, an image with poor contrast and poor sharpness may have its strength value automatically reduced.

The update of the image strength value is symbolically represented by "+/−1" on FIG. 1.

It shall be stressed that if user data becomes available and is used to update the strength value of a given image selected by the user, then not only the strength value of that image is updated but also the strength value of all the images in a same category as the image selected by the user.

Any image in a same category as a selected image, may have its strength value updated by the same value or a smaller value as the updated value of the selected image.

It is additionally noted that when a selected image belongs to several different categories, then the image strength values in all such categories can be updated by the same or by different update values.

In other words, when a user data is collected and corresponds to an update rule, then the data is used to update the strength values of images selected by the user and in turn the strength values of images classified in a same category than the images selected by the user.

A next step 142 of FIG. 1 comprises the automatic selection of additional images. This selection is based upon the user selection 120 of one or several images.

The additionally selected images are taken from the image categories which the user-selected image belongs to. The selection is based on the strength values and may retain images having the highest strength values.

As an example, images belonging to a category of a user-selected image and having a strength value above a threshold value can be taken. The threshold value can be predetermined or may be a weighed function of a mean strength value of all the images in the collection or all the images in a same category than the user-selected image. Other threshold calculations and especially a threshold calculation as a function of a display capability of a device running the process are not excluded.

The image selected by the user and the additional automatically selected images are displayed, simultaneously or subsequently in a display step 146. The display step can be replaced or completed by a printing step or any other subsequent image processing step.

An additional step 144 may comprise the calculation of a display layout based on the categories, and/or the strength values of the selected images.

Box 150 of FIG. 1, in mixed line, represents a device suitable to carry out the invention and having storage means able to store instructions suitable to carry out the invention when read and executed by a machine. Such a device can be a multimedia device, a photo frame, or a computer for example.

Although the method of the invention can be carried out on an already classified collection of images it may be preceded by an automatic classification process. Such process is briefly described with reference to FIG. 2.

Figure 2:
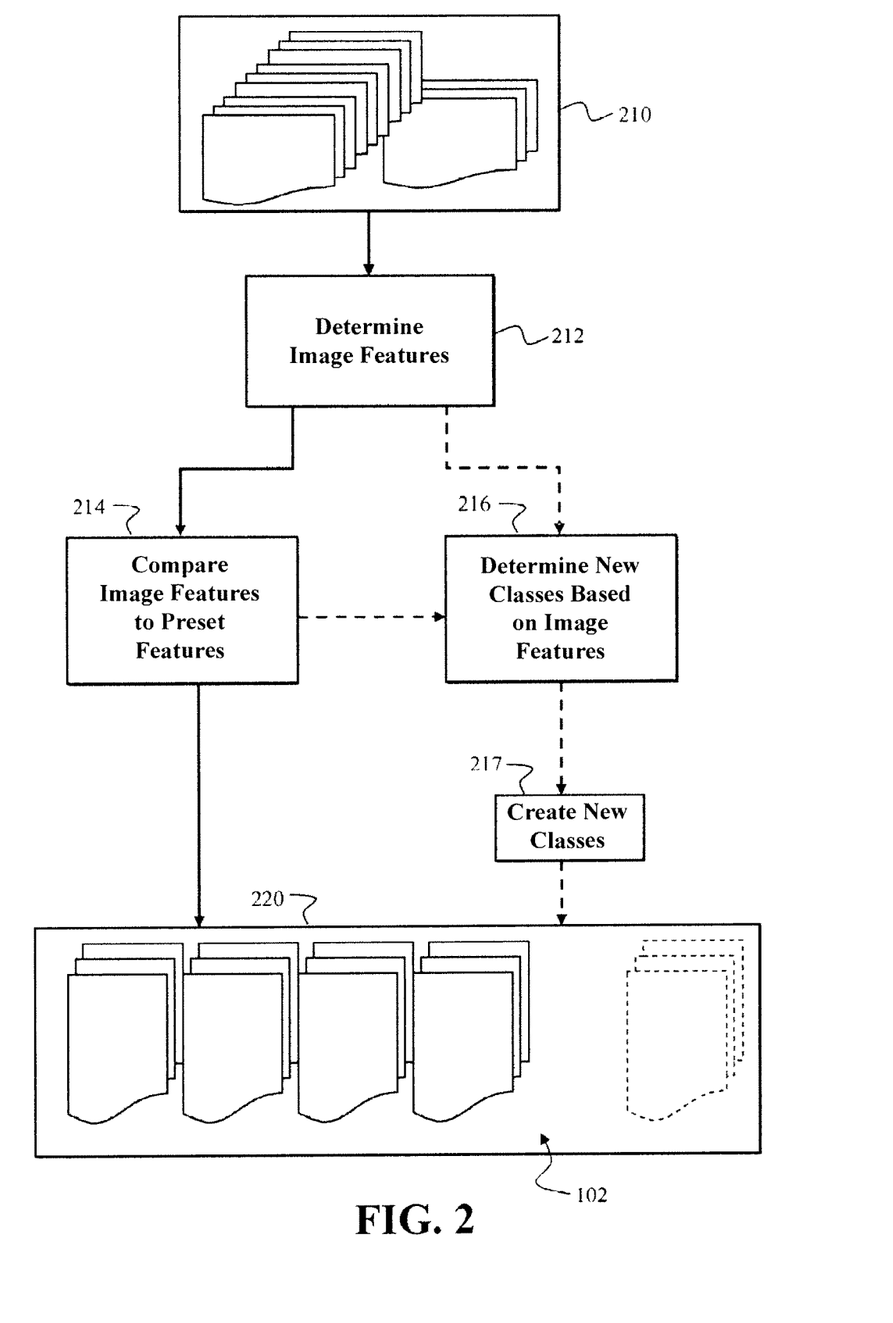
FIG. 2 is a flow chart illustrating an image classification method that may be carried out as a preliminary step of the method according to FIG. 1.

A first step 210 of this process comprises the gathering of a collection of images. This can be done, for example, by the capture of images with a capture device, the downloading of images from a remote device or the reading of the images in a memory device.

A next step 212 comprises the determining of image features for each image of the collection. The image features may be established through high or low level analysis and corresponding calculations. As previously mentioned, a face recognition engine or algorithm may be used. Providing image feature may also comprise the mere reading of metadata already attached to the image data. An example may be the feature of the capture time of an image.

In a step 214, the features of the images are then compared to preset features corresponding to preset categories or previously created categories. The preset features of a category can be set as a range of values. As an example, a category corresponding to a birthday may include a range of capture time corresponding to a predetermined day and month. Each image, having a capture time in that range, can then be sorted in that category. Other examples may include a threshold for a cross correlation calculation, a threshold for face recognition, a threshold for detection of sea, sand or landscape, etc. Of course an image can still be classified in a category based on explicit user input.

An additional step 216 may be carried out when the features of some images correspond to none of the existing classes. Such images can then be classified in sui generis classes or may be used to set new classes. When a given number of image have comparable features within a range, a new class can be created in step 217 for such images.

A last step 220 corresponds to the sorting of the images in the classes. The result of this step is a classified collection of images 102 that can be used for the previously described selection method. The sorting of image may include the creation metadata for the images indicative of the classes.

Figure 3:
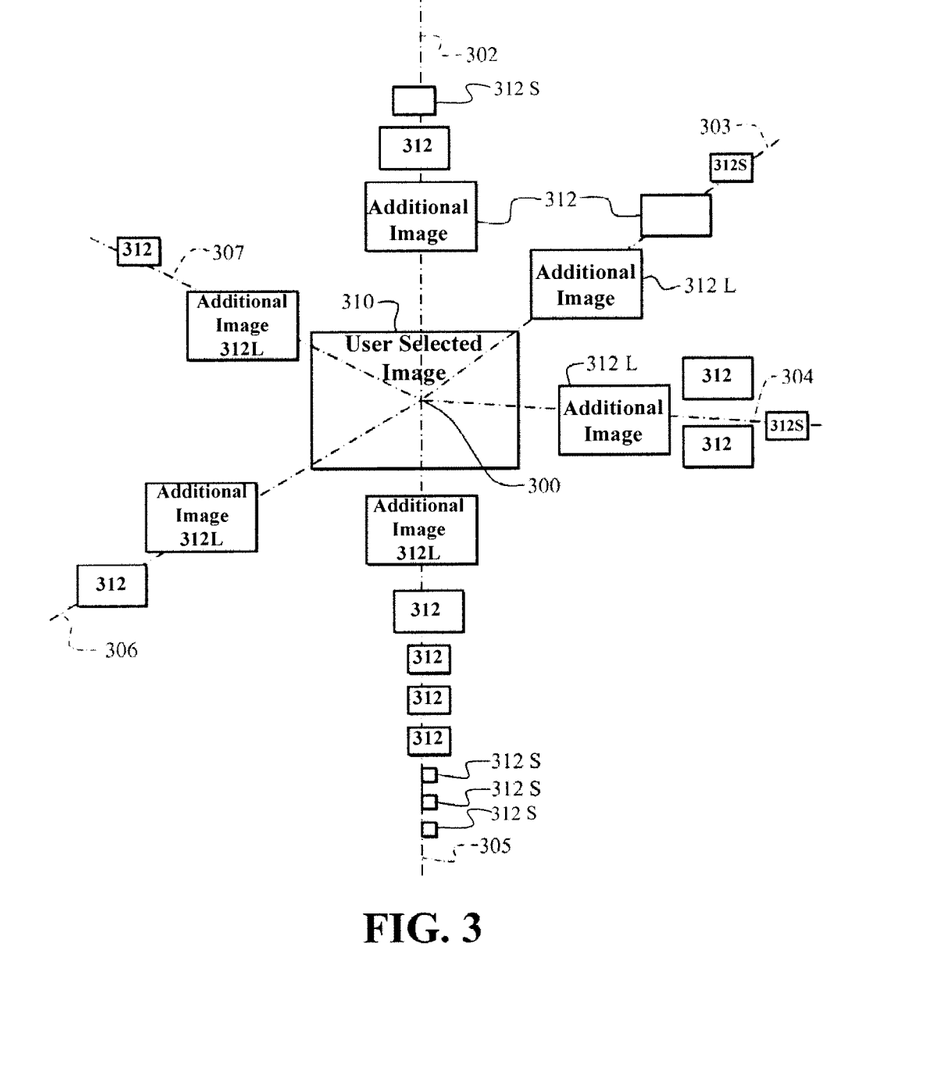
FIG. 3 is an illustration of a possible display layout of image selected according to the method of FIG. 1.

FIG. 3 shows an example of a display layout of images selected as described previously.

A spatial direction 302, 303, 304, 305, 306, 307 is allocated to each category of images a selected image belongs to. The direction can be regularly distributed over 360°, or irregularly depending on the display sizes of the selected images.

The image 310 selected by the user is displayed centrally, at the intersection of all the spatial directions, then around this image the automatically selected additional 312 images are distributed. As it appears on FIG. 3 the additional images are displayed smaller than the user-selected image and in a size decreasing from a center 300.

Especially the display size and the distance from the center, can be decreasing functions of the strength value of the additional features. The additional images 312L having a higher strength value, and deemed to be more interesting to the user are displayed in a bigger size and are located closer to the user-selected image. The images 312S with a lower strength value are more distant and smaller.

As previously mentioned all the images belonging to a same category are aligned along a same spatial direction.

If an image belongs to several categories it is possible either to display it several times or to limit its display along one single direction.

The fact that the displayed images are distributed as a function of their category and strength value allows the user to more easily browse through the collection and makes him aware of possible links between images that are displayed in a same manner or in a same area. In other words the display can be expressed as an angular or polar function of the categories and strength.

Other layouts in columns, in angular sectors, etc. may also be suitable, as long as a spatial link or distribution corresponds to the categories and that a display difference is made with respect to the strength values. As another example, a display duration for each displayed image can be calculated as a function of its strength value.

The display can be a two-dimension display or a three-dimension display.

CITED DOCUMENTS

1. US 2006/0050933
2. U.S. Pat. No. 7,043,474
3. U.S. Pat. No. 6,922,699

PART LIST

100. Provision of classified images
102, 102$i$, 102$j$, 102$k$. Images
104, 104$a$, 104$b$, 104$c$. Classes
110. Strength value allocation
112, 112$i$, 112$j$, 112$k$. Strength values
114. User input
120. Image selection
122. Data collection
130. Strength value update
142. Automatic selection of images
144. Display layout calculation
150. Multimedia device
210. Gathering step
212. Image feature determining step
214. Comparison step
216. Comparison step
217. Class creation
220. Sorting step
302, 303, 304, 305, 306, 307. Spectral direction
310. User selected image
312, 312L, 312S. Additional images

The invention claimed is:

1. A method comprising:
allocating, by a processing system, a strength value to each image in a plurality of digital images, wherein the plurality of digital images are classified into a plurality of categories;
collecting, by the processing system, user data of a user in response to a selection of at least one image from the plurality of digital images;
updating, by the processing system, the strength value of all images classified in a same category as the at least one selected image as a function of the collected user data and as a function of a visual quality of an image; and
automatically selecting, by the processing system, at least one additional image classified in at least one same category as the at least one selected image, the selection of the additional image being based on the strength value of the at least one additional image.

2. The method of claim 1, further comprising selecting additional images for which the strength value exceeds a threshold value.

3. The method of claim 1 wherein collecting user data comprises at least one of:
measuring a display duration for each image viewed by the user;
collecting data on the user's name, date of birth, age, location;
counting the number of clicks performed on a computer keyboard/mouse, whilst an image selected by the user is displayed;
capturing image of the user's face;
collecting data on prior images viewed by the same user; and measuring emotive response of the user to at least one image.

4. The method of claim 1, wherein the strength value of the at least one additional image is updated by:
- an update value proportional to the display duration of the at least one additional image;
- an update value proportional to a correlation of semantic content of the at least one additional image and a captured image of the user's face;
- a preset update value when the user's name, date of birth or location is found in metadata of the at least one selected image;
- an update value proportional to a number of clicks performed whilst the at least one additional image is displayed;
- an update value proportional to an emotive response of the user to the at least one additional image; and
- an update value proportional to the strength value of previously viewed images.

5. The method of claim 1, wherein the plurality of digital images are classified into classes corresponding to features extracted from image data.

6. The method of claim 5, wherein each image in the plurality of digital images are classified in at least one amongst the following categories:
- a category corresponding to semantic content of the image;
- a category corresponding to a time- or date-frame in which the image has been captured;
- a category corresponding to a key word stored as a metadata along with the image data;
- a category of images selected by the user in a same session on a selection/viewing device;
- a category of images selected by location of the image capture or user location; and
- a category of images selected by significance to the user.

7. The method of claim 1, further comprising:
- collecting images;
- determining features of the images based on image data and/or image metadata computation;
- searching for similarities between determined features for sets of images, and/or searching similarities between computed features and preset features of image categories;
- sorting images having similar features in common categories.

8. The method of claim 7, further comprising the automatic creation of new categories of images each time a similarity is found from among a preset number of images.

9. The method of claim 1, further comprising updating a plurality of strength values based on input from a plurality of users, wherein each of the plurality of strength values correspond to data about the corresponding user.

10. The method of claim 1, further comprising a random selection of additional images, and/or a selection of additional images for which the strength value is below a threshold value and/or a selection of additional images not classified in a same category as images selected by the user.

11. The method of claim 1, further comprising updating the strength value of the at least one additional image by an update value proportional to an emotive response of the user to the at least one additional image.

12. The method of claim 1, further comprising reducing the strength value of an image as the function of the visual quality of the image, wherein the function of visual quality determines that the visual quality of the image is poor.

13. The method of claim 12, wherein the function of the visual quality of the image is based on at least one of: contrast of the image, sharpness of the image, color analysis, spatial frequency analysis, texture analysis, and histograms analysis.

14. The method of claim 1, further comprising weighting the strength value of a first image assigned to a category with respect to a second image assigned to the category.

15. The method of claim 1, further comprising displaying the at least one additional image, wherein those of the at least one additional image corresponding to different categories are displayed in different areas of a display screen.

16. A method comprising:
- allocating, by a processing system, a strength value to each image in a plurality of digital images, wherein the plurality of digital images are classified into a plurality of categories;
- collecting, by the processing system, user data in response to a selection of at least one image from the plurality of digital images;
- updating, by the processing system, the strength value of all images classified in a same category as the at least one selected image as a function of the collected user data and as a function of a visual quality of an image;
- automatically selecting, by the processing system, at least one additional image classified in at least one same category as the at least one selected image, the selection of the additional image being based on the strength value of the at least one additional image; and
- displaying the at least one additional image, wherein each additional image is displayed with a relative size which is a function of the strength value of the additional image.

17. A non-transitory computer-readable medium having computer-readable instructions stored thereon, the computer-readable instructions comprising:
- instructions to allocate a strength value to each image in a plurality of digital images, wherein the plurality of digital images are classified into a plurality of categories;
- instructions to collect user data in response to a selection of at least one image from the plurality of digital images;
- instructions to update the strength value of all images classified in a same category as the at least one selected image as a function of the collected user data and as a function of a visual quality of an image; and
- instructions to, automatically select at least one additional image classified in at least one same category as the at least one selected image, the selection of the additional image being based on the strength value of the at least one additional image.

18. A system comprising:
- a memory configured to store a plurality of digital images;
- a processing system configured to:
  - allocate a strength value to each image in the plurality of digital images, wherein the plurality of digital images are classified into a plurality of categories;
  - collect user data in response to a selection of at least one image from the plurality of digital images;
  - update the strength value of all images classified in a same category as the at least one selected image as a function of the collected user data and as a function of a visual quality of an image; and
  - automatically select at least one additional image classified in at least one same category as the at least one selected image, the selection of the additional image being based on the strength value of the at least one additional image.

19. The system of claim 18, wherein the processor is further configured to:
- determine features of images based on image data;
- search for similarities between determined features for sets of images; and
- sort images having similar features in common categories.

20. The system of claim 18, wherein the processor is further configured to automatically create new categories of images each time a similarity is found amongst a preset number of images.

* * * * *